United States Patent [19]

Pagnoni

[11] 4,441,877

[45] Apr. 10, 1984

[54] DOUBLE OPENING PRESS FOR MANUFACTURING WOOD CHIPBOARD AND FIBRE-BOARD OR THEIR SUBSTITUTES, PROVIDED WITH FOUR HEATING PLATENS, IN WHICH THE TWO CENTRAL PLATENS ARE SEPARATED BY A RIGID PLATE

[75] Inventor: Giorgio Pagnoni, Monza, Italy

[73] Assignee: F.IIi Pagnoni S.p.A., Italy

[21] Appl. No.: 341,252

[22] Filed: Jan. 21, 1982

[30] Foreign Application Priority Data

May 22, 1981 [IT] Italy .............................. 21913 A/81

[51] Int. Cl.³ ........................... B29J 5/00; B30B 7/02; B30B 15/06

[52] U.S. Cl. .................................... 425/338; 425/406; 425/407

[58] Field of Search .................... 425/384, 41, 77, 338, 425/339, 406, 450.1, 451.5, 451.6, 589, 592, 593, DIG. 220, DIG. 222, 407

[56] References Cited

U.S. PATENT DOCUMENTS

| | | | |
|---|---|---|---|
| 1,387,617 | 8/1921 | Roberts | 425/338 X |
| 1,942,251 | 1/1934 | Mains | 425/339 |
| 2,404,165 | 7/1946 | Caroer | 425/338 X |
| 2,451,992 | 10/1948 | Te Grotenhuis | 425/41 |
| 2,521,282 | 9/1950 | Butler | 425/339 X |
| 2,581,939 | 1/1952 | Deist et al. | 425/41 |
| 2,765,587 | 10/1956 | Skerritt | 425/338 X |
| 2,801,443 | 8/1957 | Duerksen | 425/41 |
| 2,907,070 | 10/1959 | Van Hartesveldt | 425/384 |
| 2,941,248 | 6/1960 | Hall | 425/77 |
| 2,944,289 | 7/1960 | Hall | 425/77 X |
| 2,956,307 | 10/1960 | Fahrni | 425/338 X |
| 3,088,170 | 5/1963 | Steorg | 425/77 |
| 3,088,171 | 5/1963 | MacMillan | 425/41 X |
| 3,315,304 | 4/1967 | Van Elten | 425/339 |
| 3,383,737 | 5/1968 | Greger | 425/406 |

*Primary Examiner*—J. Howard Flint, Jr.
*Attorney, Agent, or Firm*—McGlew and Tuttle

[57] ABSTRACT

A double opening press comprises an intermediate movable plate, a lower fixed plate and an upper movable plate. Heating platens are connected to the upper movable and lower fixed plates and to upper and lower surfaces of the intermediate plate. The intermediate plate is rigid in structure and has dielectric layers between itself and the heating platens connected thereto so that the heating platens can be heated using high frequency energy. The intermediate plate and structures connected thereto are grounded and need not be made of electrically insulating material.

5 Claims, 2 Drawing Figures

DOUBLE OPENING PRESS FOR MANUFACTURING WOOD CHIPBOARD AND FIBRE-BOARD OR THEIR SUBSTITUTES, PROVIDED WITH FOUR HEATING PLATENS, IN WHICH THE TWO CENTRAL PLATENS ARE SEPARATED BY A RIGID PLATE

FIELD AND BACKGROUND OF THE INVENTION

Multi-opening and double opening presses are already known in the manufacture of chipboard and fiberboard or their substitutes (here collectively called particle board).

The multi-opening presses have the drawback in that there are lengthy dead times during the processing cycle, while the single opening presses have the obvious drawback of poor output.

SUMMARY OF THE INVENTION

The Applicant has devised a double opening press which permits both the high output of the multi-opening presses as well as the simplicity and reduction of dead times which are features of the single opening presses.

The double opening press in accordance with the invention permits the above advantages as it is provided with four heating platens, of which the central two platens are separated by a rigid plate. Thanks to its rigidity, this plate permits the formation of finished products to minimum thickness tolerances. On the other hand, the plate has provision for electrical grounding when high frequency heating is used for the central platens. Due to this, there is no need to employ special insulating materials for the support and guide means of the plate, or for the spacers of the press. Means are also provided for moving the intermediate plate in synchronization with the upper plate. The intermediate plate is electrically insulated from the central heating platens, with which it forms a continuation, by layers of dielectric material.

An object of the present invention is thus to provide a double opening press for manufacturing wood chipboard and fibreboard or their substitutes collectively called particle board herein.

This press permits both the high output of the multi-opening presses, as well as the simplicity and reduction of dead times of the single opening presses, hence representing considerable progress in the relevant industrial field.

This progress has been achieved thanks to certain of the press's special design features.

The double opening press in accordance with invention is novel in that it is provided with four heating platens of which the central two platens are separated by a specially rigid movable plate.

Secondly this double opening press is novel in that such intermediate plate is electrically insulated from the central platens thanks to the layers of dielectric material.

Thirdly this double opening press is novel in that it is provided with support and guide means for the intermediate plate with the two central platens, as well as spacers for setting the thickness of the product. All these items are located on electrically grounded parts of the press, and therefore can be made of non-insulating materials when high frequency heating is adopted.

Fourthly, this double opening press is novel in that the two central platens, that is the lower platen of the upper opening and the upper platen of the lower opening can be heated at different temperatures for improved adjustment of the technological curing conditions.

These and other less important characteristics will appear clear from the following completion of the description together with the accompanying drawings.

These drawings are given as an exemplification of the principles of the invention, but not by way of limitation, illustrating a preferred embodiment of the double opening press in accordance with the invention.

BRIEF DESCRIPTION OF THE DRAWINGS

In the drawings:

FIG. 1 is a front schematic and diametrally sectioned view of a double opening press in accordance with the invention, while

DESCRIPTION OF THE PREFERRED EMBODIMENT

Figure 2:
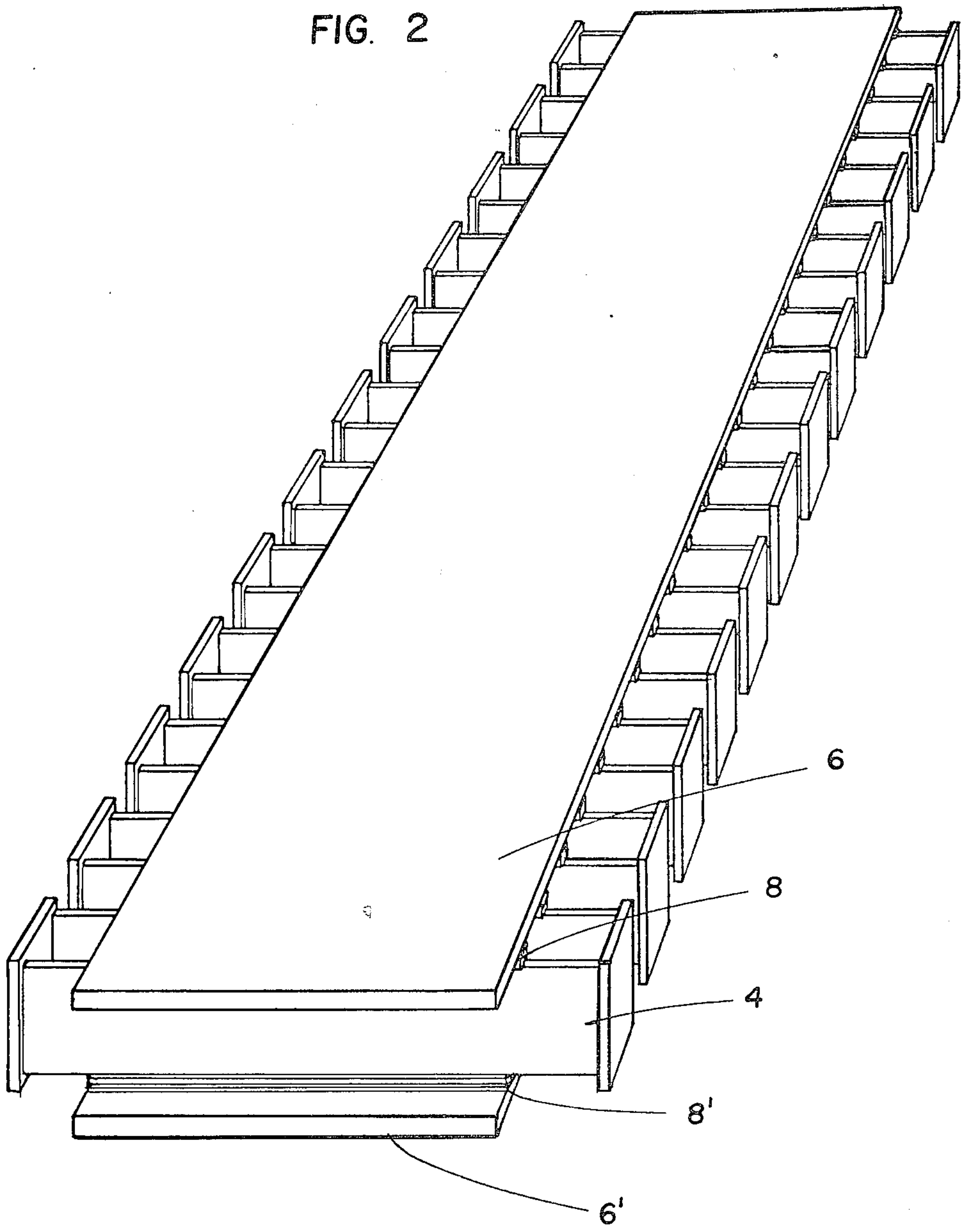
FIG. 2 is a perspective view of its characteristic intermediate plate with central heating platens from which the intermediate plate is electrically insulated by means of layers of dielectric material.

As can be seen in the accompanying drawings, the double opening press in accordance with the invention essentially comprises an external frame, which is provided with side members and a lower fixed base plate two outer heating platens 5,5', as well as two other central heating platens 6,6', a movable upper plate 3 controlled by cylinder-piston units 2,2', and an intermediate movable plate 4 likewise controlled by means of appropriate cylinder-piston units 15. As shown in FIG. 2, plate 4 is made of a plurality of vertical plate parts with adjacent pairs connected at their ends.

A layer of heat insulating material 7 is provided between upper plate 3 and upper heating platen 5.

Likewise, the lower heating platen 5' is provided with a lower layer of heat insulating material 7'.

Layers of dielectric material 8,8' are also provided between the intermediate plate 4 and the central heating platens 6,6', which form a continuation of said plate.

This construction (heating platen 6-intermediate plate 4-heating platen 6') is, as stated in the background section, entirely novel and characterizes the double opening press in accordance with the invention. Furthermore, it offers the following advantages:

(a) almost total elimination of deflection of intermediate element 4 due to its own weight, accomplished by the particularly rigid construction;

(b) provision for correcting any errors of the group 6-4-6' with respect to the horizontal plane, thereby guarantying a finished product with minimum thickness tolerance;

(c) provision for heating the two platens 6 and 6' at two different temperatures so as to obtain the best technological conditions for curing the boards; and (d) easy application of a high frequency heating apparatus.

Only the intermediate heating platens 6,6', are in face electrically chargeable at high frequency. The intermediate plate 4 is, as already seen, insulated from them and is grounded.

Consequently, the support and guide elements of said plate 4 and the press spacers can all be made of non-insulating material and therefore they have a longer working life. Such elements include those designated by the numerals 12,12',15,15',16,16',17,17' in the figure.

Figure 1:
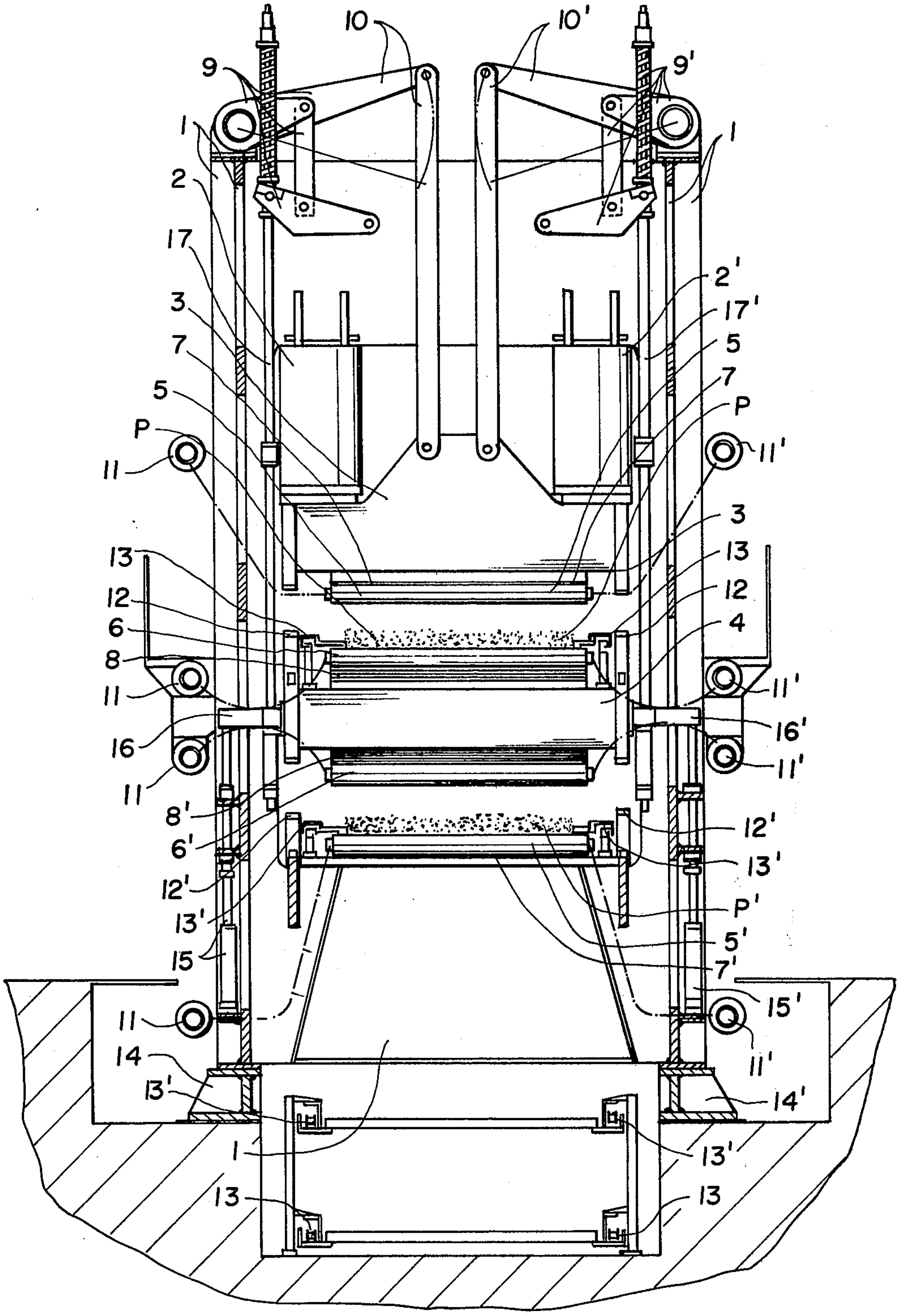

More precisely, as can be seen in FIG. 1, spacers 12,12 serve to set the thickness of board P. Those for the upper opening are designated by 12, while those for setting thickness of board P' in the lower opening are designated by 12'. The cylinder-piston units for raising the intermediate plate 4 are designated by 15 and 15'.

Side brackets 16 and 16' are provided as support and guide means for plate 4.

Lastly tie-rods 17 and 17' are provided for simultaneous closing the press openings.

The double opening press is also provided with other important parts for its correct operation but these parts are only represented schematically as they are characteristic within themselves and are object of other copending patent applications.

The numerals 9,9' designate the drive means for simultaneous closing of the press openings, while 10,10' designate the lever system for guaranty constant horizontal closing of the upper movable plate 3, and 13,13' the chains for loading and unloading the product in and from the press.

Lastly, for the sake of completeness the numerals 11,11' of the drawing (in FIG. 1) designate the piping for supplying the heating medium to platens 5,5', 6,6', and numerals 14,14' designate the press support beams already known in the art.

I claim:

1. A double opening press for manufacturing particle board comprising:

a frame having a lower fixed plate;

and upper movable plate mounted to said frame;

upper plate drive means connected to said upper movable plate for moving said upper movable plate vertically;

outer heating platens connected to a top surface of said lower fixed plate and a bottom surface of said upper movable plate;

a rigid intermediate plate extending between said upper and lower plates and connected to said frame;

upper and lower additional heating platens fixed to upper and lower surfaces of said intermediate platen whereby upper and lower openings are defined between said intermediate plate and said upper and lower plates respectively intermediate plate drive means connected between said plate and said frame for driving said intermediate plate vertically;

said upper and lower additional heating platens are electrically insulated from said rigid intermediate plasten between upper and lower surface of said intermediate plate and said upper and lower additional heating platens respectively; and guide means connected between said intermediate plate and said frame and a plurality of spacers connected to said intermediate plate for setting a thickness of a particle board to be produced, said intermediate plate drive means, guide means and spacers, and said intermediate plate being grounded and being made of non-electrically insulating material.

2. A double opening press according to claim 1 wherein said electrical insulation comprises a plurality of layers of dielectric material.

3. A double opening press according to claim 1 including heating means connected to said upper and lower heating platens for heating said upper and lower heating platens to different temperatures.

4. A double opening press according to claim 1 wherein said rigid intermediate plate comprises a plurality of vertically extending plate parts each separated from said upper and lower additional heating platens by a plurality of layers of dielectric material.

5. A double opening press according to claim 4 wherein adjacent pairs of said vertically extending plate parts are connected to each other at opposite ends thereof.

* * * * *